United States Patent
Genera et al.

(10) Patent No.: US 7,694,942 B1
(45) Date of Patent: Apr. 13, 2010

(54) SWAMP COOLER FILTER

(76) Inventors: Felipe Genera, 4303 Paseo Caroleta, Palm Springs, CA (US) 92264; Eva Genera, 4303 Paseo Caroleta, Palm Springs, CA (US) 92264

( * ) Notice: Subject to any disclaimer, the term of this patent is extended or adjusted under 35 U.S.C. 154(b) by 890 days.

(21) Appl. No.: 11/515,969

(22) Filed: Sep. 5, 2006

Related U.S. Application Data

(63) Continuation of application No. 10/942,567, filed on Sep. 17, 2004, now abandoned.

(51) Int. Cl.
F28D 5/02 (2006.01)
B01D 29/11 (2006.01)

(52) U.S. Cl. .................. 261/3; 261/5; 210/151; 210/167.01; 210/446; 210/448; 62/85; 62/121; 62/304; 62/310

(58) Field of Classification Search .......... 210/184, 210/416.1, 153, 150, 151, 167.01, 232, 446, 210/448, 449, 460, 459, 445; 95/214; 261/DIG. 11, 261/94–107, 3, 5; 96/296, 297, 240; 62/121, 62/85, 311, 310, 304, 315
See application file for complete search history.

(56) References Cited

U.S. PATENT DOCUMENTS

| | | | | |
|---|---|---|---|---|
| 1,832,776 A | * | 11/1931 | Hudson | 210/94 |
| 2,384,057 A | * | 9/1945 | Wetherell | 210/489 |
| 2,491,796 A | * | 12/1949 | Baume | 210/448 |
| 2,658,325 A | | 11/1953 | Refferty | |
| 3,317,043 A | * | 5/1967 | Vanderpoel | 210/94 |
| 4,287,067 A | | 9/1981 | Dyner | |
| 4,468,357 A | * | 8/1984 | Miller et al. | 261/29 |
| 4,759,842 A | * | 7/1988 | Frees et al. | 210/94 |
| 4,894,156 A | * | 1/1990 | Murken | 210/448 |
| 4,966,550 A | * | 10/1990 | Privat | 433/25 |
| 5,286,377 A | | 2/1994 | Galvan | |
| 5,361,600 A | * | 11/1994 | Kelley | 62/310 |
| 5,492,143 A | | 2/1996 | Cooper et al. | |
| 5,606,868 A | * | 3/1997 | Calvert | 62/315 |
| 5,662,791 A | * | 9/1997 | Hurst et al. | 210/94 |
| 5,911,745 A | * | 6/1999 | Conner | 62/91 |
| 6,141,986 A | * | 11/2000 | Koplin | 62/304 |
| 6,182,463 B1 | * | 2/2001 | Strussion et al. | 62/314 |
| 6,367,277 B1 | * | 4/2002 | Kinkel | 62/310 |
| 6,367,278 B1 | * | 4/2002 | Strussion et al. | 62/314 |
| 7,428,823 B2 | * | 9/2008 | Reinders | 62/304 |
| 2004/0074251 A1 | * | 4/2004 | Shahbaz | 62/305 |
| 2004/0262240 A1 | * | 12/2004 | Oke | 210/758 |

* cited by examiner

Primary Examiner—Duane Smith
Assistant Examiner—Ives Wu
(74) Attorney, Agent, or Firm—Emery L. Tracy

(57) ABSTRACT

A swamp cooler filter for filtering debris from fluid drawn from a fluid reservoir for a swamp cooler is provided. The swamp cooler filter includes a water intake hose being operationally coupled to a swamp cooler whereby the water intake hose is in fluid communication between a fluid reservoir and a pump of the swamp cooler. A filter member is selectively positioned in the water intake hose. The filter member is for filtering debris from the fluid being drawn from the fluid reservoir by the pump to inhibit the debris being pumped through the swamp cooler by the pump.

19 Claims, 5 Drawing Sheets

SWAMP COOLER FILTER

The present application is a continuation and claims benefit of priority of patent application Ser. No. 10/942,567, filed on Sep. 17, 2004, now abandoned entitled "Swamp Cooler Filter".

BACKGROUND OF THE INVENTION

1. Field of the Invention

The present invention relates to evaporative cooler pump assemblies and more particularly pertains to a new swamp cooler filter for filtering debris from fluid drawn from a fluid reservoir for a swamp cooler.

2. Description of the Prior Art

The use of evaporative cooler pump assemblies is known in the prior art. More specifically, evaporative cooler pump assemblies heretofore devised and utilized are known to consist basically of familiar, expected and obvious structural configurations, notwithstanding the myriad of designs encompassed by the crowded prior art which have been developed for the fulfillment of countless objectives and requirements.

In the past, filters have been used for filtering debris from water lines leading into various products. However, none of the filters are positioned within the swamp cooler to clean the lines within the swamp cooler. The act of cleaning the water lines within the swamp cooler is a tedious and unpleasant task.

In these respects, the swamp cooler filter according to the present invention substantially departs from the conventional concepts and designs of the prior art, and in so doing provides an apparatus primarily developed for the purpose of filtering debris from fluid drawn from a fluid reservoir for a swamp cooler.

SUMMARY

In view of the foregoing disadvantages inherent in the known types of evaporative cooler pump assemblies now present in the prior art, the present invention provides a new swamp cooler filter construction wherein the same can be utilized for filtering debris from fluid drawn from a fluid reservoir for a swamp cooler.

To attain this, the present invention generally comprises a water intake hose being operationally coupled to a swamp cooler whereby the water intake hose is in fluid communication between a fluid reservoir and a pump of the swamp cooler. A filter member is selectively positioned in the water intake hose. The filter member is for filtering debris from the fluid being drawn from the fluid reservoir by the pump to inhibit the debris being pumped into the water lines.

There has thus been outlined, rather broadly, the more important features of a swamp cooler filter system in order that the detailed description thereof that follows may be better understood, and in order that the present contribution to the art may be better appreciated. There are additional features of the swamp cooler filter system that will be described hereinafter and which will form the subject matter of the claims appended hereto.

In this respect, before explaining at least one embodiment of the swamp cooler filter system in detail, it is to be understood that the swamp cooler filter system is not limited in its application to the details of construction and to the arrangements of the components set forth in the following description or illustrated in the drawings. The swamp cooler filter system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present swamp cooler filter system. It is important, therefore, that the claims be regarded as including such equivalent constructions insofar as they do not depart from the spirit and scope of the present invention.

One significant advantage of the present invention is to reduce the amount of time required to clean the piping of a swamp cooler and improve the efficiency of the swamp cooler.

It is an object of the present invention to provide a swamp cooler filter system which has all of the advantages of the prior art and none of the disadvantages.

It is another object of the present invention to provide a swamp cooler filter system which may be easily and efficiently manufactured and marketed.

It is another object of the present invention to provide a swamp cooler filter system which is of durable and reliable construction.

It is yet another object of the present invention to provide a swamp cooler filter system which is economically affordable and available for relevant market segment of the purchasing public.

Other objects, features and advantages of the present invention will become more readily apparent from the following detailed description of the preferred embodiment when considered with the attached drawings and appended claims.

DETAILED DESCRIPTION OF THE PREFERRED EMBODIMENTS

Figure 1:
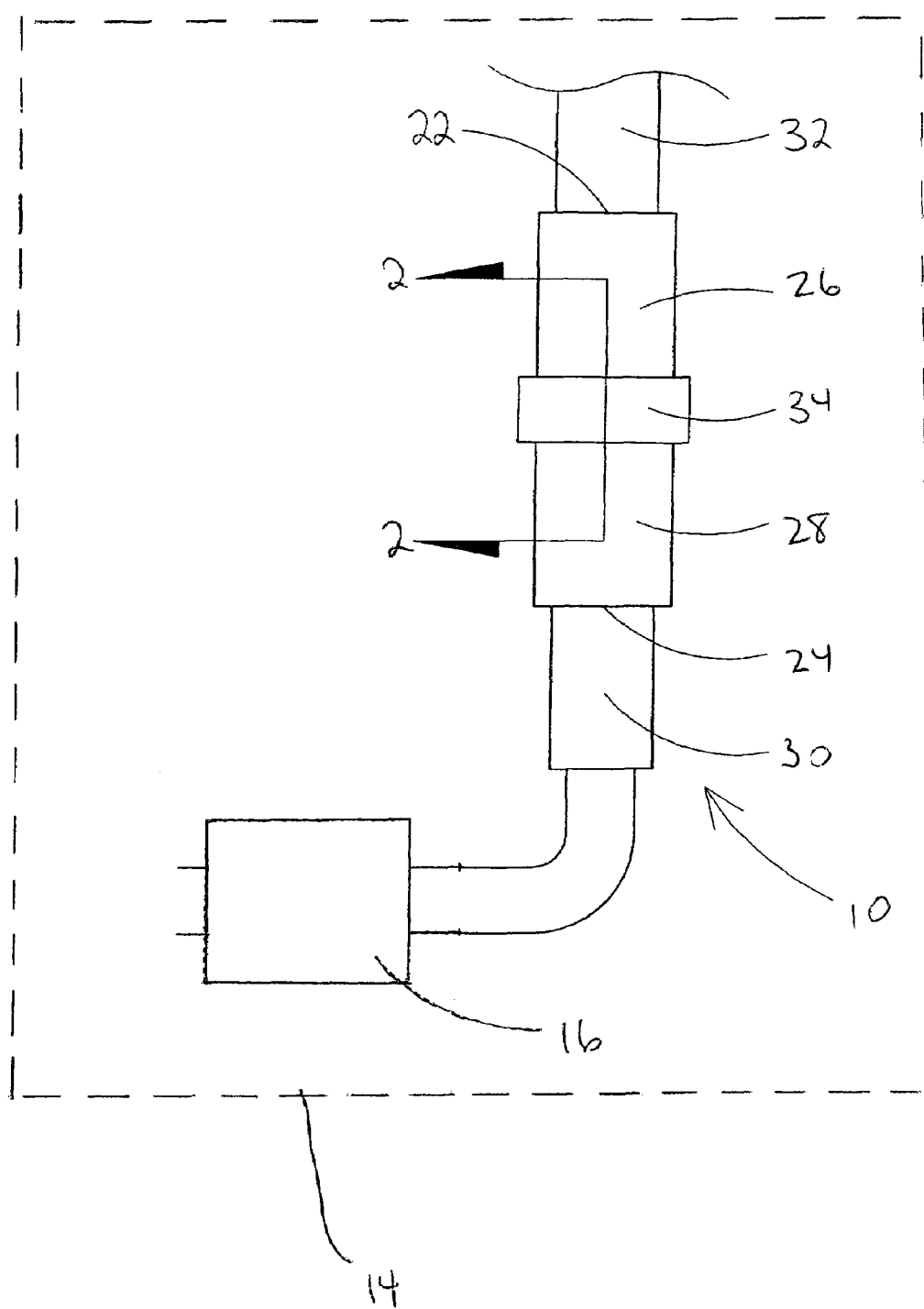
FIG. 1 is a side view illustrating a swamp cooler filter, constructed in accordance with the present invention, with the swamp cooler filter being positioned within a swamp cooler.

With reference now to the drawings, and in particular to FIGS. 1-4 thereof, a new swamp cooler filter embodying the principles and concepts of the present invention and generally designated by the reference numeral 10 will be described.

Figure 4:
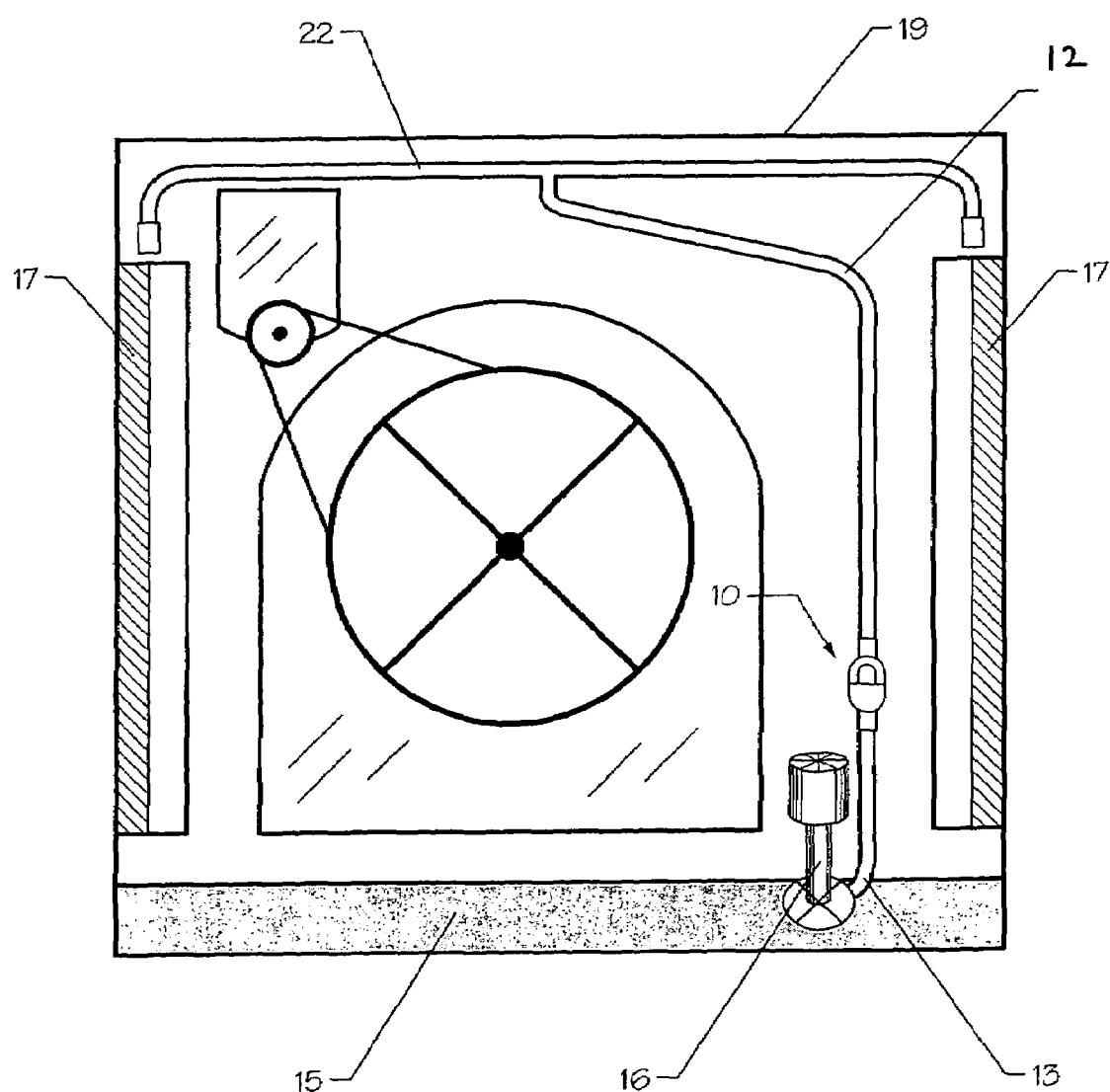
FIG. 4 is a side view illustrating the swamp cooler filter, constructed in accordance with the present invention, with the swamp cooler filter mounted within the swamp cooler.

As best illustrated in FIGS. 1 and 4, the swamp cooler filter 10 of the present invention is positioned within a swamp cooler 14 and is not positioned outside the walls 19 of the swamp cooler 14. The swamp cooler 14 has a water pump 16 pumping water from a water reservoir 15 into a water intake hose 12. The water reservoir 15 is positioned at the base of the swamp cooler 14. The water pump 16 is positioned within the water reservoir 15 with the water intake hose 12 attached to the water pump 16. The swamp cooler filter 10 is positioned along the water intake hose 12 between the water pump 16 and the water intake lines 22. The water flows through the swamp cooler filter 10 into the water intake lines 22 and trickles onto the cooler pads 17. In a preferred embodiment, the swamp cooler filter 10 is mounted to the water intake hose 12 directly adjacent the water pump 16.

The swamp cooler filter 10 of the present invention includes a filter member 18 selectively positioned within the water intake hose 12. The filter member 18 filters debris from the water being drawn from the water reservoir 15 by the water pump 16 inhibiting the debris being pumped through the swamp cooler 14 by the water pump 16.

Figure 2:
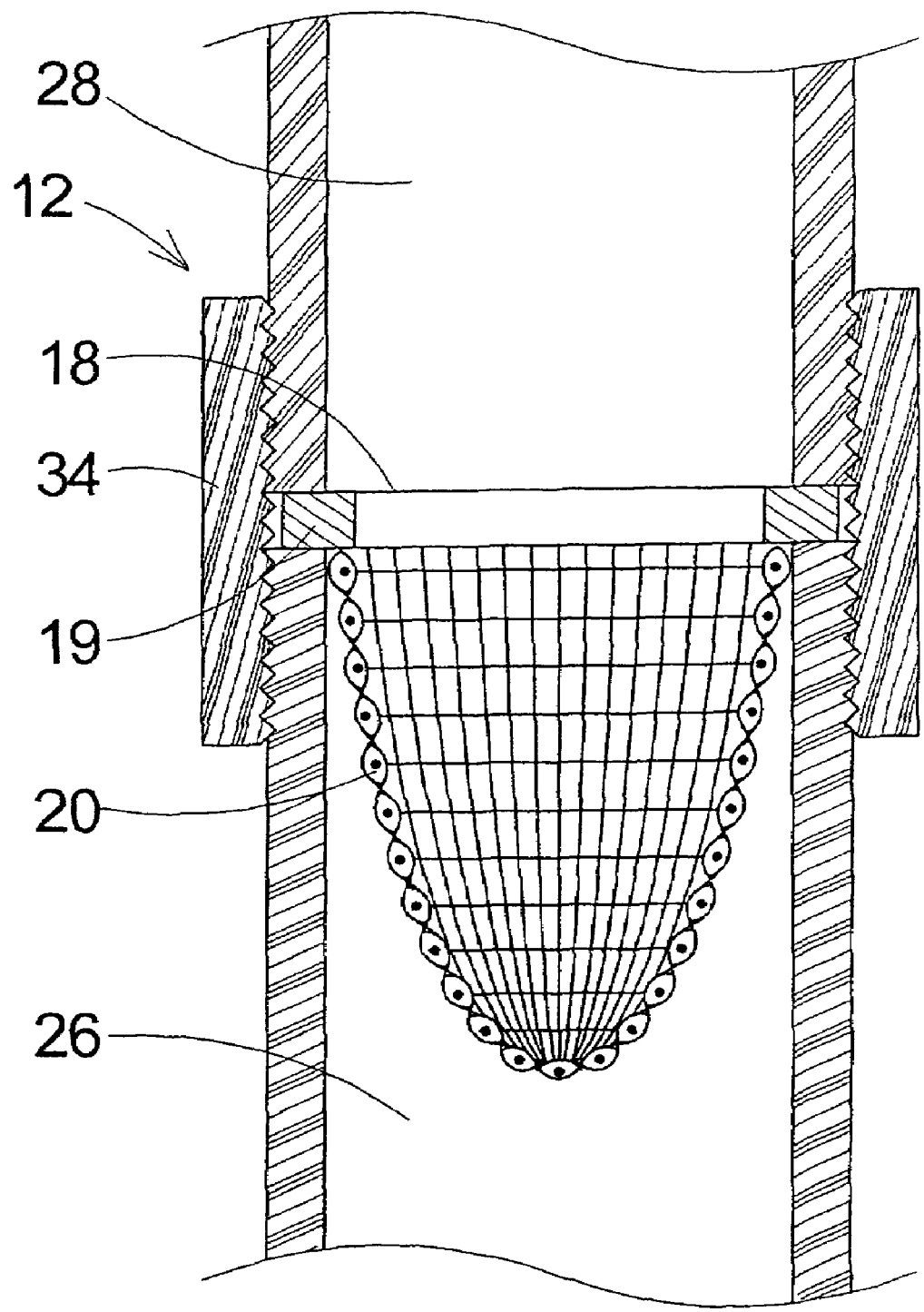
FIG. 2 is a cross-sectional view illustrating the swamp cooler filter taken along line 2-2 of FIG. 1, constructed in accordance with the present invention.
Figure 3:
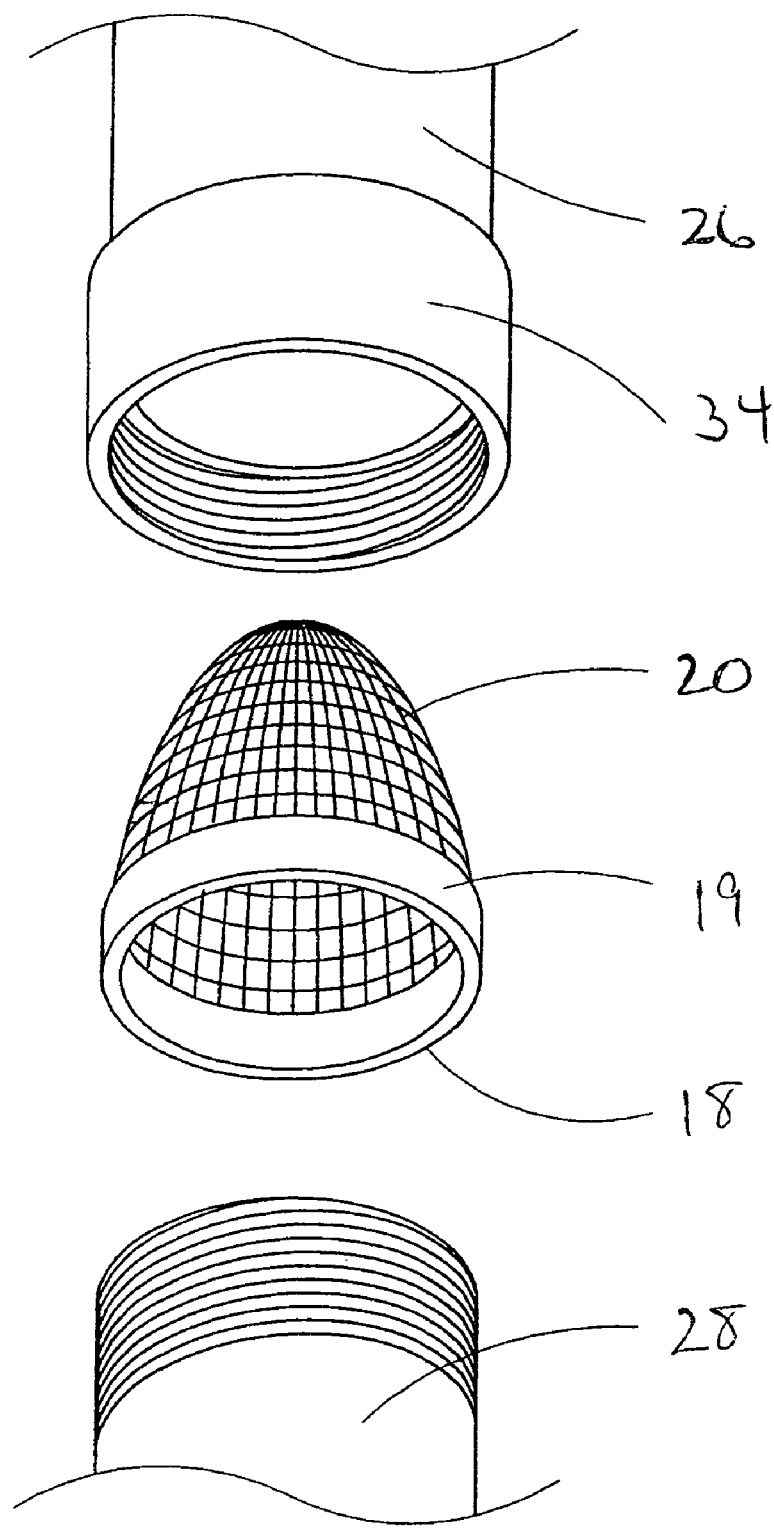
FIG. 3 is an exploded perspective view illustrating the swamp cooler filter, constructed in accordance with the present invention.

In addition, as illustrated in FIGS. 2 and 3, the swamp cooler filter 10 of the present invention includes a base portion 19 of the filter member 18 coupled to a filter portion 20 of the filter member 18. The base portion 19 of the swamp cooler filter 10 is inserted into the water intake hose 12 whereby the base portion 19 engages the water intake hose 12 to inhibit fluid passing between the water intake hose 12 and the base portion 19. The filter portion 20 of the swamp cooler filter 18 is suspended in the water intake hose 12 by the base portion 19 to allow the fluid to pass through the filter portion 20 and allow the filter portion 20 to filter debris from the fluid.

The filter portion 20 of the filter member 18 is substantially convex or parabolic to provide a greater surface area for filtering the fluid being drawn through the water intake hose 12. The filter portion 20 extends away from the base portion 19. The filter portion 20 of the filter member 18 has a depth substantially equal to a diameter of the base portion 19.

An input end 22 of the water intake hose 12 is in fluid communication with the water reservoir 15. An output end 24 of the water intake hose 12 is in fluid communication with the water intake lines 13 of the swamp cooler 14. The filter portion 20 of the filter member 18 is directed away from the input end 22 of the water intake hose 12 to force the fluid into the filter portion 20 of the filter member 18 when the fluid is being drawn through the water intake hose 12. By positioning the filter member 18 as described, maximum filter area is created from capturing debris within the filter member 18.

The filter portion 20 preferably comprises a mesh material. The mesh material is for permitting fluid to pass through the filter portion 20 and inhibiting passage of debris through the filter portion 20.

As further illustrated in FIGS. 2 and 3, a coupling collar 34 of the water intake hose 12 is rotatably coupled to the inlet pipe 26 of the water intake hose 12. The coupling collar 34 selectively engages the outlet pipe 28 of the water intake hose 12 to secure the inlet pipe 26 to the outlet pipe 28 and the filter member 18 between the inlet pipe 26 and the outlet pipe 28.

In use of the first embodiment, the user cuts the water intake hose 12 of the swamp cooler 14. The outlet pipe 28 of the water intake hose 12 is coupled to the inlet conduit 30 of the swamp cooler 14 and the inlet pipe 26 of the water intake hose 12 is coupled to the outlet conduit 32 of the swamp cooler 14. The base portion 19 of the filter member 18 is abutted against the inlet pipe 26 of the water intake hose 12 so that the filter portion 20 extends into the inlet pipe 26 and is directed towards the outlet conduit 32 of the swamp cooler 14. The outlet pipe 28 is then abutted against the base portion 19 of the filter member 18 and the coupling collar 34 rotated to engage the outlet pipe 28 and secure the outlet pipe 28 to the inlet pipe 26. The water pump 16 of the swamp cooler 14 draws fluid, specifically water, from the fluid reservoir through the filter portion 20 of the filter member 18 to filter debris from the fluid and inhibit the debris being pumped through the swamp cooler 14 by the water pump 16. When the filter member 18 has become plugged the coupling collar 34 is disengaged from the outlet pipe 28 and the filter member 18 removed from the inlet pipe 26. The filter member 18 may then be cleaned and then replaced in the inlet pipe 26 or the plugged filter member 18 may be discarded and a new filter member 18 inserted into the inlet pipe 26.

Figure 5:
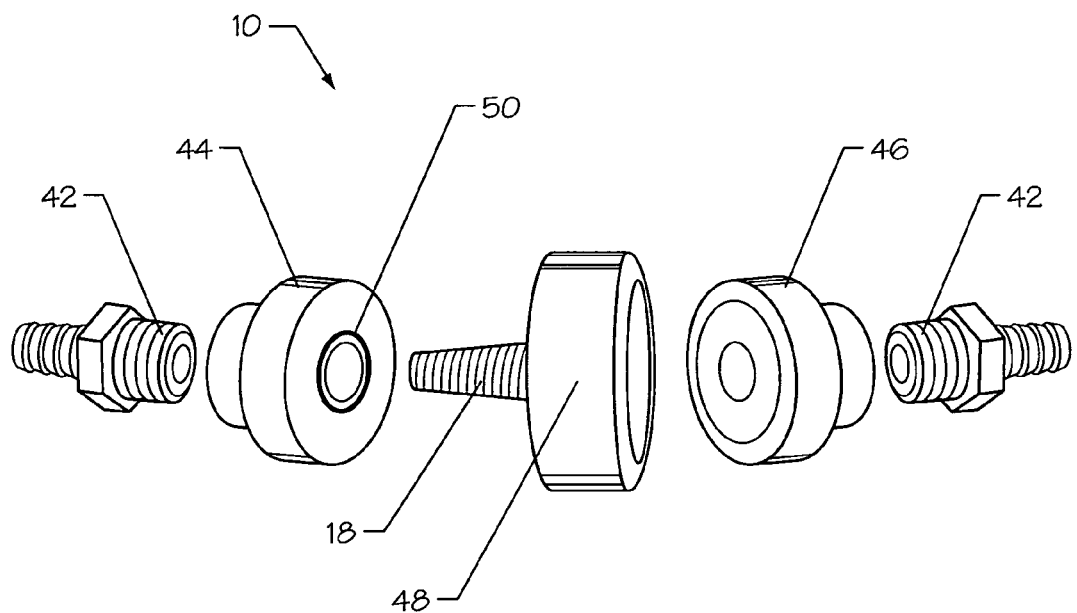
FIG. 5 is a perspective view illustrating another embodiment of the swamp cooler filter, constructed in accordance with the present invention.

As illustrated in FIG. 5, in another embodiment of the present invention, the swamp cooler filter 10 includes two ribbed connecting ends 42, a hollow first fitting 44, a hollow second fitting 46, a filter holding device 48, and the filter member 18. The connecting ends are receivable within the water intake hose 12. The first fitting 44 is threadably secured to one of the connecting ends 42 with the filter holding device 48 threadably secured to the first fitting 44. The first fitting 44 includes a flexible washer member 50 between the first fitting 44 and the filter holding device 48 to inhibit leakage.

The filter holding device 48 includes a shoulder (not shown). The second fitting 46 is positioned through the filter holding device 48 with a portion of the second fitting 46 resting on the shoulder. The second fitting is 46 threadably secured to the other connecting end 42. The filter member 18 is enclosed between the first fitting 44 and the filter holding device 48 with the filter portion 20 extending into the first fitting 44.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A swamp cooler filter system for filtering liquid within a swamp cooler, the swamp cooler filter system comprising:
   a water reservoir positioned entirely within the swamp cooler;
   a water pump positioned within the reservoir;
   a water intake hose fluidly connected to the water pump, the water intake hose being entirely positioned within the swamp cooler;
   a filter member positioned within the water intake hose, the filter member having a filter portion, the filter member filtering debris from the fluid being drawn from the reservoir by the water pump;
   two ribbed connecting ends;
   a hollow first fitting;
   a hollow second fitting;
   a filter holding device;
   wherein the connecting ends are receivable within the water intake hose;
   wherein the first fitting is threadably secured to one of the connecting ends;
   wherein the filter holding device is threadably secured to the first fitting;
   wherein the second fitting is positioned through the filter holding device;
   wherein the second fitting is threadably secured to the other connecting end; and wherein the filter member is enclosed between the first fitting and the filter holding device with the filter portion extending into the first fitting.

2. The swamp cooler filter system of claim 1 wherein the filter member as a substantially parabolic cross-sectional configuration.

3. The swamp cooler filter system of claim 1 wherein the filter member further has a base portion, the base portion coupled to the filter portion, the base portion insertable into the water intake hose such that the base portion engages the water intake line inhibiting fluid passing between the water intake line and the base portion, the filter portion being suspended in the water intake line by the base portion allowing the fluid to pass through the filter portion and allowing the filter portion to filter debris from the fluid.

4. The swamp cooler filter system of claim 3 wherein the filter portion of the filter member is substantially convex thereby providing a greater surface area for filtering the fluid being drawn through the water intake hose, the filter portion extending away from the water pump.

5. The swamp cooler filter system of claim 3 wherein the filter portion of the filter member has a depth substantially equal to a diameter of the base portion.

6. The swamp cooler filter system of claim 4 and further comprising:
an input end of the water intake hose, the input end fluidly connected to the reservoir; and
an output end of the water intake hose, the output end leading to cooler pads of the swamp cooler;
wherein the filter portion of the filter member is directed towards the input end of the water intake hose forcing the fluid around the filter portion of the filter member when the fluid is being drawn through the water intake hose.

7. The swamp cooler filter system of claim 2 wherein the filter portion comprises a mesh material, the mesh material permitting fluid to pass through the filter portion and inhibiting passage of debris through the filter portion.

8. The swamp cooler filter system of claim 1 and further comprising:
an inlet pipe of the water intake hose, the inlet pipe being coupled to the reservoir; and
an outlet pipe of the water intake hose, the outlet pipe leading to cooler pads of the swamp cooler;
wherein the inlet pipe is coupled to the outlet pipe to allow fluid from the reservoir to be drawn through the water intake hose by the water pump of the swamp cooler; and
further wherein the filter member is positioned between the inlet pipe and the outlet pipe to permit fluid flowing through the water intake hose to be filtered.

9. The swamp cooler filter system of claim 8 wherein the outlet pipe of the water intake hose has a diameter greater than a diameter of an inlet conduit of the swamp cooler in fluid communication with the water pump of the swamp cooler, the outlet pipe of the water intake hose for permitting the inlet conduit of the swamp cooler to be inserted into the outlet pipe of the water intake hose.

10. The swamp cooler filter system of claim 7 wherein the inlet pipe of the water intake hose has a diameter greater than a diameter of an outlet conduit of the swamp cooler being in fluid communication with the cooler pads, the inlet conduit of the water intake hose for permitting the outlet conduit of the swamp cooler to be inserted into the inlet pipe of the water intake hose.

11. The swamp cooler filter system of claim 7 and further comprising:
a coupling collar of the water intake hose being rotatably coupled to the inlet pipe of the water intake hose;
wherein the coupling collar selectively engages the outlet pipe of the water intake hose to secure the inlet pipe to the outlet pipe and the filter member between the inlet pipe and the outlet pipe.

12. A method for filtering liquid within a swamp cooler, the swamp cooler having at least one cooler pad, the method comprising:
positioning a water reservoir entirely within the swamp cooler;
positioning a water pump entirely within the swamp cooler;
positioning a water line entirely within the swamp cooler;
fluidly connecting the water line to the water pump;
trickling fluid to each of the cooler pads from the water line;
providing two ribbed connecting ends;
providing a hollow first fitting;
providing a hollow second fitting;
providing a filter holding device;
positioning the connecting ends receivable within the water intake hose;
threadably securing the first fitting to one of the connecting ends;
threadably securing the filter holding device to the first fitting;
positioning the second fitting through the filter holding device;
threadably securing the second fitting to the other connecting end;
providing a filter member having a filter portion
enclosing the filter member between the first fitting and the filter holding device with the filter portion extending into the first fitting;
filtering debris from the fluid being drawn from the reservoir by the water pump; and
inhibiting the debris from being pumped through the water lines by the water pump.

13. The method of claim 12 wherein the filter member as a substantially parabolic cross-sectional configuration.

14. The method of claim 12 wherein the filter member further has a base portion, the base portion coupled to a filter portion, the base portion insertable into the water intake line such that the base portion engages the water intake line inhibiting fluid passing between the water intake line and the base portion, the filter portion being suspended in the water intake line by the base portion allowing the fluid to pass through the filter portion and allowing the filter portion to filter debris from the fluid.

15. The method of claim 14 wherein the filter portion of the filter member is substantially convex thereby providing a greater surface area for filtering the fluid being drawn through the water intake hose, the filter portion extending away from the water pump in a general direction toward the cooler pads.

16. The method of claim 14 wherein the filter portion of the filter member has a depth substantially equal to a diameter of the base portion.

17. The method of claim 14 and further comprising:
an input end of the water intake hose, the input end fluidly connected to the reservoir; and
an output end of the water intake hose, the output end leading to the cooler pads of the swamp cooler;
wherein the filter portion of the filter member is directed towards the input end of the water intake hose forcing the fluid around the filter portion of the filter member when the fluid is being drawn through the water intake hose.

18. The method of claim 15 wherein the filter portion comprises a mesh material, the mesh material permitting fluid to pass through the filter portion and inhibiting passage of debris through the filter portion.

19. A swamp cooler filter system for filtering liquid within a swamp cooler, the swamp cooler filter system comprising:
- a water reservoir positioned within the swamp cooler;
- a water pump positioned within the water reservoir;
- a water intake hose fluidly connected to the water pump;
- two ribbed connecting ends receivable within the water intake hose;
- a hollow first fitting threadably secured to one of the connecting ends;
- a filter holding device threadably secured to the first fitting;
- a hollow second fitting positioned through the filter holding device, the second fitting threadably secured to the other connecting end; and
- a filter member enclosed between the first fitting and the filter holding device, the filter member having a base portion and a filter portion, the filter portion extending into the first fitting;

wherein the filter member filters debris from the fluid being drawn from the reservoir by the water pump.

* * * * *